(12) United States Patent
Schmid

(10) Patent No.: US 11,228,253 B2
(45) Date of Patent: Jan. 18, 2022

(54) CONVERTER ARRANGEMENT WITH REDUCED INFLUENCE OF INTERFERENCE FREQUENCIES

(71) Applicant: SIEMENS MOBILITY GMBH, Munich (DE)

(72) Inventor: Robert Schmid, Heroldsbach (DE)

(73) Assignee: Siemens Mobility GmbH, Munich (DE)

( * ) Notice: Subject to any disclaimer, the term of this patent is extended or adjusted under 35 U.S.C. 154(b) by 106 days.

(21) Appl. No.: 16/644,605

(22) PCT Filed: Aug. 13, 2018

(86) PCT No.: PCT/EP2018/071882
§ 371 (c)(1),
(2) Date: Mar. 5, 2020

(87) PCT Pub. No.: WO2019/048186
PCT Pub. Date: Mar. 14, 2019

(65) Prior Publication Data
US 2021/0067051 A1 Mar. 4, 2021

(30) Foreign Application Priority Data
Sep. 5, 2017 (DE) .............................. 102017215598

(51) Int. Cl.
*H02M 1/14* (2006.01)
*H02M 5/458* (2006.01)
(Continued)

(52) U.S. Cl.
CPC ........... *H02M 5/4585* (2013.01); *H02J 50/12* (2016.02); *H02M 1/0058* (2021.05)

(58) Field of Classification Search
CPC ...... H02M 1/14; H02M 1/143; H02M 5/4585; H02M 5/458
See application file for complete search history.

(56) References Cited

U.S. PATENT DOCUMENTS 4,170,734 A * 10/1979 Woodruff ................. H05G 1/24
378/103
5,668,708 A 9/1997 Scapellati
(Continued)

FOREIGN PATENT DOCUMENTS

EP 1309075 A2 5/2003
EP 1971016 A2 9/2008
(Continued)

OTHER PUBLICATIONS

Bin Gou et al.: "Analysis and Compensation of Beat Phenomenon for Railway Traction Drive System Fed with Fluctuating DC-Link Voltage", 2012 IEEE 7th International Power Electronics and Motion Control Conference—ECCE Asia, Jun. 2-5, 2012 (Jun. 2, 2012) Harbin, China, pp. 654-659, XP032215696.

*Primary Examiner* — Sisay G Tiku
(74) *Attorney, Agent, or Firm* — Laurence Greenberg; Werner Stemer; Ralph Locher

(57) ABSTRACT

A converter assembly has a rectifier receiving an external alternating voltage of a specified feed frequency, an inverter, and a DC link with a DC link capacitor electrically between the rectifier and the inverter. An absorption circuit, which is connected in parallel with the DC link capacitor, forms a series resonance circuit and is of low impedance at a series resonance frequency twice the feed frequency. The absorption circuit forms a parallel resonance circuit together with the DC link capacitor and has high impedance at a parallel resonance frequency. A damping absorption circuit, connected in parallel with the DC link capacitor and the absorption circuit, includes an ohmic resistor and is magnetically coupled to the absorption circuit. A voltage dropping at the absorption circuit at the parallel resonance frequency is transformed by the magnetic coupling to the (Continued)

damping absorption circuit. The resistor damps the parallel resonance of the absorption circuit.

9 Claims, 2 Drawing Sheets

(51) Int. Cl.
    *H02J 50/12* (2016.01)
    *H02M 1/00* (2006.01)

(56) References Cited

U.S. PATENT DOCUMENTS

| | | | |
|---|---|---|---|
| 2002/0113562 A1* | 8/2002 | Raith | H02P 29/50 318/114 |
| 2002/0113585 A1* | 8/2002 | Dillig | H02P 27/06 323/355 |
| 2002/0117913 A1* | 8/2002 | Raith | H02M 1/12 310/68 R |
| 2005/0073863 A1* | 4/2005 | de Rooij | H02M 1/12 363/39 |
| 2007/0278988 A1 | 12/2007 | De et al. | |
| 2012/0098351 A1* | 4/2012 | Ross | A61B 18/1233 307/104 |
| 2015/0280588 A1 | 10/2015 | Marrero | |
| 2017/0104417 A1* | 4/2017 | Hung | H02M 3/3376 |
| 2018/0083539 A1* | 3/2018 | Reed | H05B 45/385 |

FOREIGN PATENT DOCUMENTS

| | | |
|---|---|---|
| JP | S62131757 A | 6/1987 |
| JP | H06303774 A | 10/1994 |
| RU | 2210852 C1 | 8/2003 |
| RU | 2454782 C1 | 6/2012 |

* cited by examiner

CONVERTER ARRANGEMENT WITH REDUCED INFLUENCE OF INTERFERENCE FREQUENCIES

BACKGROUND OF THE INVENTION

Field of the Invention

The invention relates to a converter arrangement having a rectifier, to which an external AC voltage of a predefined supply frequency can be applied, an inverter, and an intermediate circuit which comprises an intermediate circuit capacitor and is electrically arranged between the rectifier and the inverter.

Such converter arrangements are used in the field of railway technology, for example. There, they are used to convert a single-phase electrical input current from an external energy supply network, which input current is transmitted via a catenary or a busbar for example, in order to provide, on the output side, a vehicle's own supply voltage having properties which are desired in the vehicle, for example with respect to a desired output frequency, a desired number of electrical phases and/or a desired voltage level.

During rectification, the problem arises of a large number of rectifiers on the output side outputting, inter alia, a first harmonic—based on the supply frequency—that is to say an interference frequency at twice the supply frequency which can adversely affect the inverter or its output voltage.

SUMMARY OF THE INVENTION

The invention is based on the object of specifying a converter arrangement in which the influence of interference frequencies is reduced.

This object is achieved, according to the invention, by means of a converter arrangement having the as claimed. Advantageous configurations of the converter arrangement according to the invention are specified in the dependent claims.

Accordingly, the invention provides for an absorption circuit to be connected electrically in parallel with the intermediate circuit capacitor, for the absorption circuit to form a series resonant circuit and to have a low impedance at a series resonant frequency corresponding to twice the supply frequency, for the absorption circuit, together with the intermediate circuit capacitor, to form a parallel resonant circuit and to have a high impedance at a parallel resonant frequency, for a damping absorption circuit to be connected electrically in parallel with the intermediate circuit capacitor and the absorption circuit, to comprise a non-reactive resistor and to be magnetically coupled to the absorption circuit, and for the voltage dropped across the absorption circuit at the parallel resonant frequency to be transformed by the magnetic coupling to the damping absorption circuit, and for the resistor of the damping absorption circuit to thereby damp the parallel resonance of the absorption circuit.

An important advantage of the converter arrangement according to the invention can be seen in the fact that the parallel resonance caused by the absorption circuit, which is primarily used to suppress the first harmonic generated by the rectifier, is damped by the damping absorption circuit additionally provided according to the invention, with the result that the negative influence of the parallel resonance on the electrical behavior of the converter arrangement is minimized.

A further important advantage of the converter arrangement according to the invention can be seen in the fact that the capacitance of the absorption circuit can be selected independently of the parallel resonance because its influence is minimized by the damping absorption circuit.

With regard to a small number of components, it is considered to be advantageous if the absorption circuit is formed by a first series circuit comprising an inductor and a capacitance, called first capacitance below, the inductor, the first capacitance and the intermediate circuit capacitor form the parallel resonant circuit, a second series circuit is connected electrically in parallel with the intermediate circuit capacitor and the first series circuit, which second series circuit forms the damping absorption circuit and comprises a winding, a resistor and a capacitance, called second capacitance below, the winding of the second series circuit is magnetically coupled to the inductor of the first series circuit, and the voltage dropped across the inductor at the parallel resonant frequency is transformed by the winding to the second series circuit.

The second capacitance is preferably between 0.1 and ten times the first capacitance, particularly preferably between 0.5 and 1.5 times the first capacitance.

The resistance of the second series circuit is preferably such that:

$$0.8 \cdot \frac{1}{j \cdot 2\pi \cdot fs \cdot C1} < R < 10 \cdot \frac{1}{j \cdot 2\pi \cdot fs \cdot C1}$$

where R denotes the resistance of the second series circuit, C1 denotes the first capacitance and fs denotes the supply frequency.

The inductance of the winding of the second series circuit is preferably between 0.1 and 0.5 times the inductor inductance of the inductor of the first series circuit.

The coupling inductance M between the winding of the second series circuit and the inductor of the first series circuit is preferably between 0.1 and 0.7 times the inductance of the winding.

The number of windings of the winding is preferably between 5 and 50.

The invention also relates to a vehicle, in particular a rail vehicle or an electrically operated road vehicle. According to the invention, the vehicle is equipped with a converter arrangement as described above.

The invention is explained in more detail below on the basis of exemplary embodiments; in this case, by way of example,

DETAILED DESCRIPTION OF THE INVENTION

For the sake of clarity, the same reference signs are always used for identical or comparable components in the figures.

Figure 1:
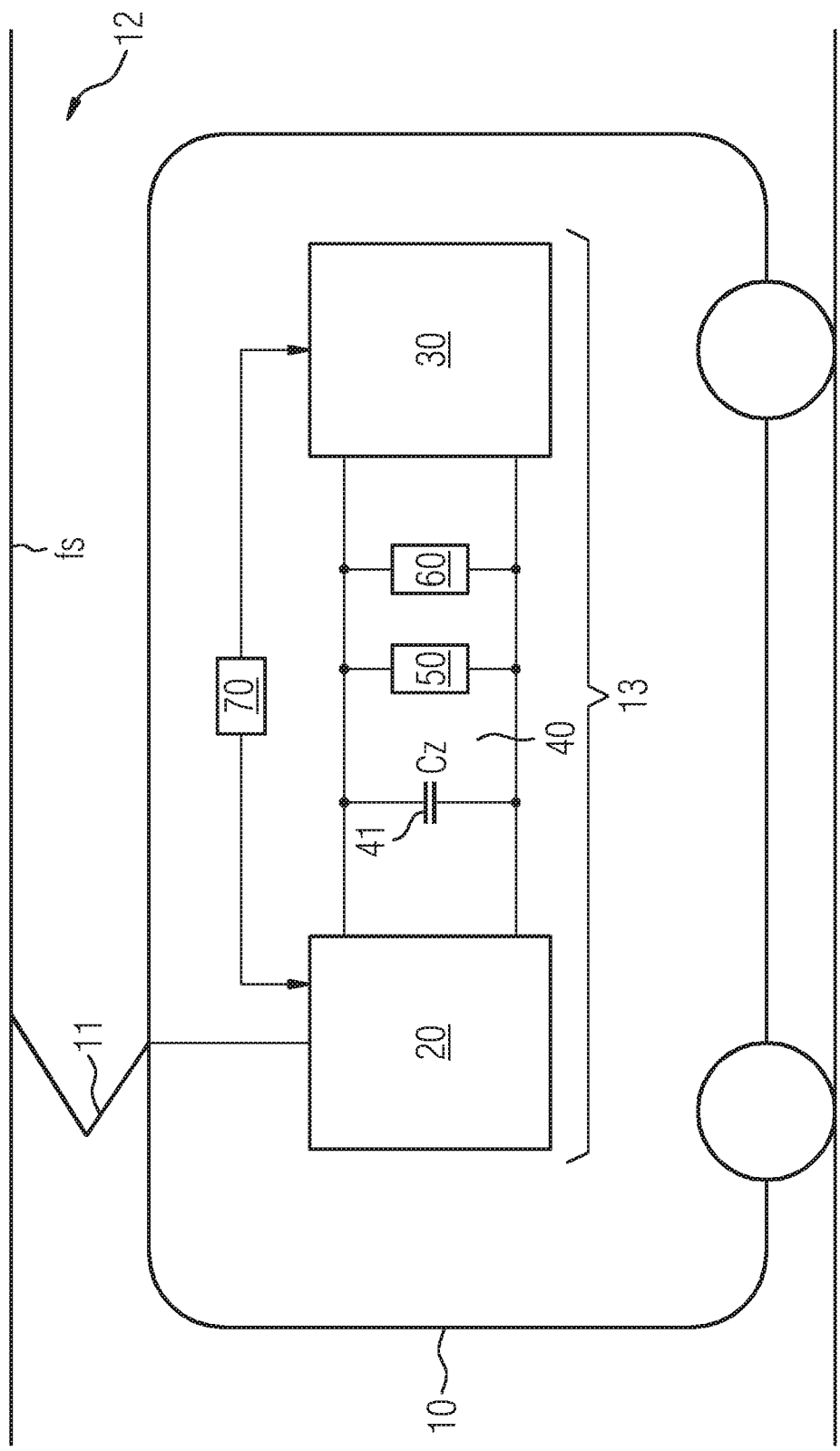
FIG. 1 shows an exemplary embodiment of a rail vehicle according to the invention which is equipped with an exemplary embodiment of a converter arrangement according to the invention.

FIG. 1 shows a rail vehicle 10 which is connected to an external energy supply network 12 via a pantograph 11. The external energy supply network 12 provides an AC voltage at a predefined supply frequency fs of 50 Hz or 16⅔ Hz, for example.

The rail vehicle 10 has a rectifier 20 which is coupled to the pantograph 11 and therefore to the external energy supply network 12. An inverter 30 is arranged downstream of the rectifier 20 and is controlled in such a manner that it generates a single-phase or multiphase AC voltage at the desired output frequency on the output side.

An electrical intermediate circuit 40 comprising an intermediate circuit capacitor 41 with a capacitance Cz, an absorption circuit 50 connected in parallel and a damping absorption circuit 60 connected in parallel is situated between the rectifier 20 and the inverter 30. The absorption circuit 50 and the damping absorption circuit 60 are inductively coupled to one another.

The rectifier 20, the inverter 30 and the electrical intermediate circuit 40 comprising the intermediate circuit capacitor 41, the absorption circuit 50 and the damping absorption circuit 60 form a converter arrangement 13, in which the rectifier 20 and the inverter 30 can be controlled in pulsed operation by a control device 70 belonging to the converter arrangement or by an external control device and form a pulse-controlled converter.

The absorption circuit 50 has a series resonance at a series resonant frequency corresponding to twice the supply frequency fs of the external energy supply network 12. In the case of a supply frequency fs of 16⅔ Hz, the series resonant frequency is therefore 33⅓ Hz and, in the case of a supply frequency fs of 50 Hz, it is 100 Hz.

The absorption circuit 50 has a low impedance at series resonance or at twice the supply frequency fs, with the result that the first harmonic which is generated by the rectifier 20 during rectification and is at twice the supply frequency fs is short-circuited in the intermediate circuit 40.

The absorption circuit 50 also forms, with the intermediate circuit capacitor 41, a parallel resonant circuit, the parallel resonant frequency of which is greater than the series resonant frequency or exceeds twice the supply frequency. The absorption circuit 50 has a high impedance at the parallel resonant frequency.

The parallel resonance of the absorption circuit 50 is damped by the damping absorption circuit 60. For this purpose, the damping absorption circuit 60 preferably has at least one non-reactive resistor which interacts with the absorption circuit 50 by means of magnetic or inductive coupling and damps the parallel resonance.

Figure 2:
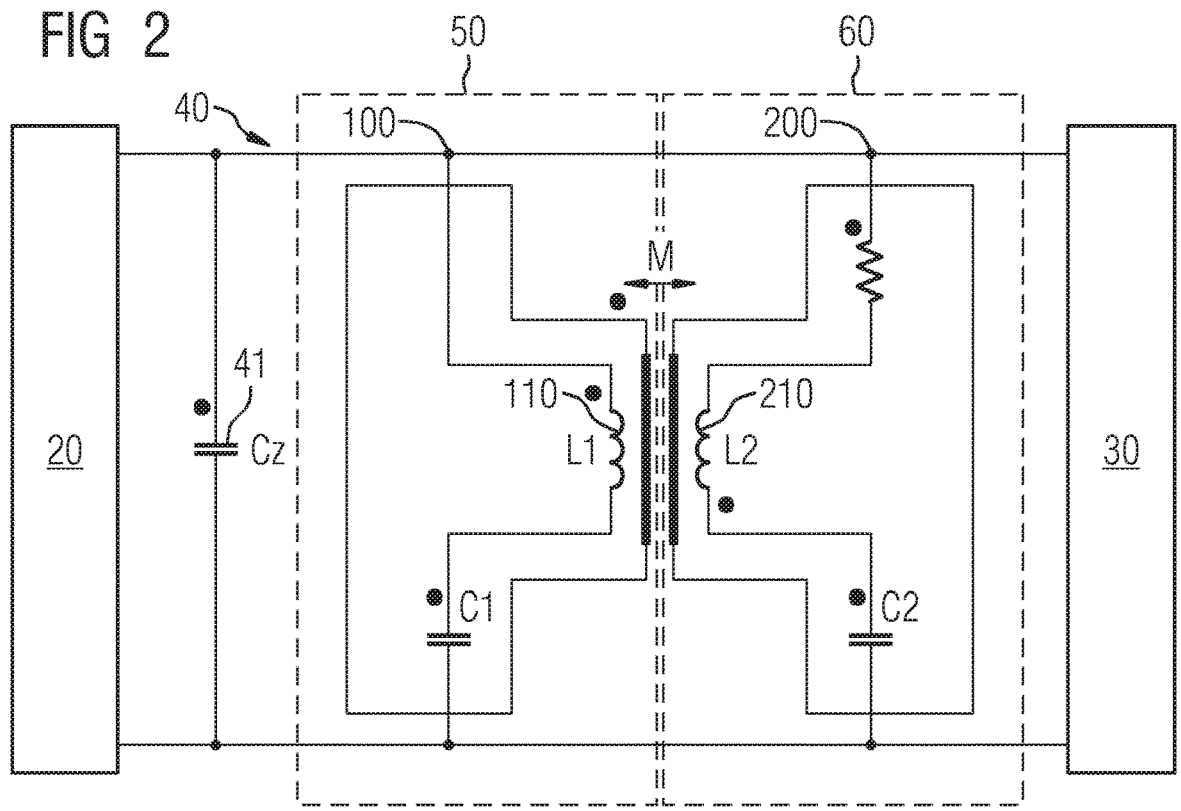
FIG. 2 shows an exemplary embodiment of an intermediate circuit for the converter arrangement according to FIG. 1 more specifically in detail.

FIG. 2 shows an exemplary embodiment of the intermediate circuit 40 according to FIG. 1 more specifically in detail. The intermediate circuit capacitor 41, the absorption circuit 50 connected in parallel and the damping absorption circuit 60 are seen.

In the exemplary embodiment according to FIG. 2, the absorption circuit 50 is formed by a series circuit, called first series circuit 100 below, comprising an inductor 110 and a capacitance C1, called first capacitance below.

The inductance L1 of the inductor 110 and the capacitance C1 are such that the first series circuit 100 has a low impedance at twice the supply frequency fs. This is the case if:

$$f1 = \frac{1}{2 \cdot \pi \cdot \sqrt{L1 \cdot C1}} = 2 \cdot fs$$

where f1 denotes the series resonant frequency of the first series circuit 100 or of the absorption circuit 50 and fs denotes the supply frequency of the external energy supply network 12.

The first harmonic which is generated by the rectifier 20 during rectification and the frequency of which is twice the supply frequency f1 is therefore short-circuited by the absorption circuit 50.

In the exemplary embodiment according to FIG. 2, the damping absorption circuit 60 is formed by a series circuit, called second series circuit 200 below, comprising a non-reactive resistor R, a winding 210 and a capacitance C2, called second capacitance below. The winding 210 of the second series circuit 200 or of the damping absorption circuit 60 is magnetically coupled to the inductor 110 of the first series circuit or of the absorption circuit 50; the coupling inductance is indicated using the reference sign M.

For the parallel resonant frequency of the absorption circuit 50, the first series circuit 100 has a high impedance, with the result that the voltage dropped across the inductor 110 is transformed by the winding 210 to the second series circuit 200 and therefore to the damping absorption circuit 60, as a result of which the resistor R of the damping absorption circuit 60 in turn damps the parallel resonance of the absorption circuit 50.

The parallel resonant frequency f2 results from the inductance L1 of the inductor 110, the first capacitance C1 and the capacitance Cz of the intermediate circuit capacitor 41 as follows:

$$f2 = \frac{1}{2 \cdot \pi \cdot \sqrt{L1 \cdot \frac{C1 \cdot Cz}{C1 + Cz}}}$$

The following dimensioning ranges are considered to be advantageous for the components of the damping absorption circuit 60:

The following preferably applies to the second capacitance C2:

$$0.5 \cdot C1 \leq C2 \leq 1.5 \cdot C1$$

The capacitance C2 is used primarily to block direct current through the damping absorption circuit 60.

The following preferably applies to the non-reactive resistance R:

$$0.8 \cdot \frac{1}{j \cdot 2\pi \cdot f \cdot C1} < R < 10 \cdot \frac{1}{j \cdot 2\pi \cdot f \cdot C1}$$

The following preferably applies to the inductance of the winding 210:

$$0.5 \cdot L1 \leq L2 \leq 0.8 \cdot L1$$

where L1 denotes the inductance of the inductor 110 and L2 denotes the inductance L2 of the winding 210.

The following preferably applies to the magnetic coupling between the inductor 110 and the winding 210:

$$0.1 \cdot L2 \leq M \leq 0.7 \cdot L2$$

where M denotes the coupling inductance between the inductor 110 and the winding 210.

Figure 3:
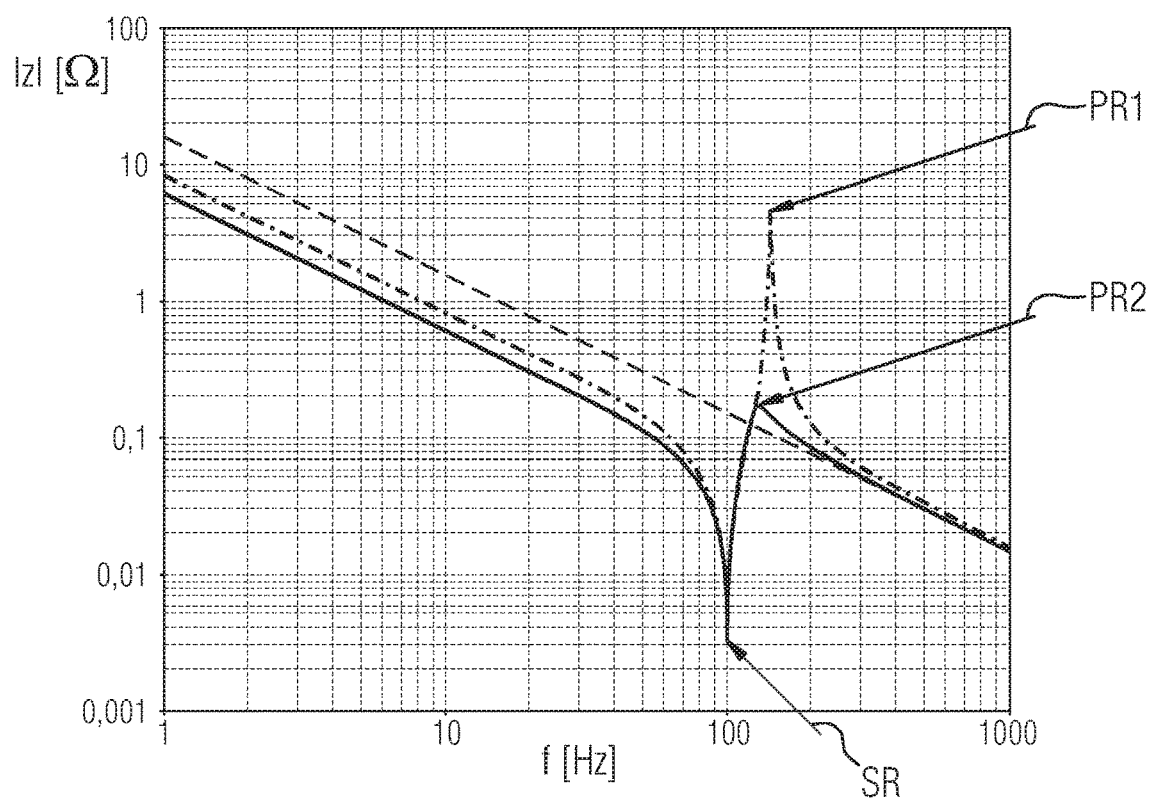
FIG. 3 shows the impedance profile of the intermediate circuit in the exemplary embodiment according to FIG. 2.

FIG. 3 shows, by way of example, the impedance profile of an intermediate circuit 40 which is designed for a supply frequency of 50 Hz and in which the absorption circuit 50 accordingly has a low impedance for a series resonance of 100 Hz (see arrow with the reference sign SR). It can be seen that the impedance of the intermediate circuit 40 becomes minimal at twice the supply frequency, that is to say at 100 Hz here.

FIG. 3 also shows that the impedance of the intermediate circuit 40 becomes very large when the parallel resonance occurs (see arrow with the reference sign PR1). In order to reduce this effect or damp the parallel resonance, the damping absorption circuit 60 explained is provided, the resistor R of which acts on the absorption circuit 50 by means of the magnetic or inductive coupling and damps the level of the parallel resonance when it occurs (see arrow with the reference sign PR2).

In summary, the converter arrangement 13 described above by way of example therefore operates as follows:

At low frequencies $$f < f1 = \frac{1}{2 \cdot \pi \cdot \sqrt{L1 \cdot C1}},$$

voltage drops across the inductances L1 and L2 or the inductor 110 and the winding 210 do not play a significant role; the capacitances Cz, C1 and C2 are connected in parallel.

For the parallel resonant frequency $$f2 = \frac{1}{2 \cdot \pi \cdot \sqrt{L1 \cdot \frac{C1 \cdot Cz}{C1 + Cz}}},$$

the absorption circuit 50 and the damping absorption circuit 60 are at resonance. A very high voltage is dropped across the inductor 110 and is transformed to the winding 210. On account of the polarity of the connection, a current now flows through the resistor R which generates electrical losses and damps the parallel resonance.

For high frequencies $$f > f2 = \frac{1}{2 \cdot \pi \cdot \sqrt{L1 \cdot \frac{C1 \cdot Cz}{C1 + Cz}}},$$

the impedance of the intermediate circuit capacitor 41 is considerably less than the resistance R. The absorption circuit 50 is inductive. The intermediate circuit capacitor 41 therefore acts substantially alone.

The converter arrangement 13 described above by way of example may have one, more or all of the following advantages:

- It is not necessary to curtail the performance of the inverter 30 by the additional task of actively adjusting intermediate circuit oscillations.
- Sporadically occurring excitations of the intermediate circuit 40 will generally not result in dangerously high intermediate circuit voltages.
- System perturbations can be considerably reduced by dispensing with the undesirably high impedance at the parallel resonant frequency f2.

Although the invention has been described and illustrated more specifically in detail by means of preferred exemplary embodiments, the invention is not restricted by the disclosed examples and other variations can be derived therefrom by a person skilled in the art without departing from the scope of protection of the invention.

The invention claimed is:

1. A converter arrangement, comprising:
a rectifier configured to receive an external AC voltage of a predefined supply frequency;
an inverter; and
an intermediate circuit electrically connected between said rectifier and said inverter, said intermediate circuit including an intermediate circuit capacitor;
an absorption circuit electrically connected in parallel with said intermediate circuit capacitor;
said absorption circuit forming a series resonant circuit and having a low impedance at a series resonant frequency corresponding to twice the supply frequency;
said absorption circuit, together with said intermediate circuit capacitor, forming a parallel resonant circuit and having a high impedance at a parallel resonant frequency;
a damping absorption circuit electrically connected in parallel with said intermediate circuit capacitor and said absorption circuit, said damping absorption circuit including a non-reactive resistor and being magnetically coupled to said absorption circuit;
wherein a voltage dropped across said absorption circuit at the parallel resonant frequency is transformed by the magnetic coupling to said damping absorption circuit, and said resistor of said damping absorption circuit thereby damps the parallel resonance of said absorption circuit; and
wherein:
said absorption circuit is formed by a first series circuit having an inductor and a capacitance being a first capacitance;
said inductor, said first capacitance, and said intermediate circuit capacitor form said parallel resonant circuit,
a second series circuit is electrically connected in parallel with said intermediate circuit capacitor and said first series circuit, and wherein said second series circuit forms said damping absorption circuit and includes a winding, a resistor, and a capacitance being a second capacitance;
a winding of said second series circuit is magnetically coupled to said inductor of said first series circuit; and
said voltage dropped across said inductor at the parallel resonant frequency is transformed by said winding to said second series circuit.

2. The converter arrangement according to claim 1, wherein said second capacitance is between 0.1 and ten times said first capacitance.

3. The converter arrangement according to claim 1, wherein said second capacitance is between 0.5 and 1.5 times said first capacitance.

4. The converter arrangement according to claim 1, wherein a resistance of said second series circuit is such that:

$$0.8 \cdot \frac{1}{j \cdot 2\pi \cdot fs \cdot C1} < R < 10 \cdot \frac{1}{j \cdot 2\pi \cdot fs \cdot C1}$$

where R denotes the resistance of said second series circuit, C1 denotes said first capacitance, and fs denotes the supply frequency.

5. The converter arrangement according to claim 1, wherein an inductance of said winding of said second series circuit is between 0.1 and 0.5 times an inductor inductance of said inductor of said first series circuit.

6. The converter arrangement according to claim 1, wherein a coupling inductance M between said winding of said second series circuit and said inductor of said first series circuit is between 0.1 and 0.7 times the inductance of said winding.

7. The converter arrangement according to claim 1, wherein a number of turns of said winding of said second series circuit is between 5 and 50.

8. A vehicle, comprising the converter arrangement according to claim 1.

9. The vehicle according to claim 8, being a rail vehicle or a road vehicle.

\* \* \* \* \*